United States Patent [19]

Beattie

[11] Patent Number: 5,000,366

[45] Date of Patent: Mar. 19, 1991

[54] PRECISION AUTOMATIC CONVERTER WELDER SYSTEM

[76] Inventor: James C. Beattie, 6747 White Stone Rd., Baltimore, Md. 21207

[21] Appl. No.: 522,891

[22] Filed: May 14, 1990

[51] Int. Cl.$^5$ ............................................. B23K 37/04
[52] U.S. Cl. .................................... 228/6.1; 228/49.1; 228/56.5; 29/889.5
[58] Field of Search ................ 228/4.1, 6.1, 44.3, 228/47, 49.1, 56.5, 212; 29/889.5

[56] References Cited

U.S. PATENT DOCUMENTS 4,004,725 1/1977 Stoner ................................ 228/49.1
4,133,470 1/1979 Trail ................................... 228/49.1

FOREIGN PATENT DOCUMENTS 2754660 6/1979 Fed. Rep. of Germany ..... 228/49.1
1433703 10/1988 U.S.S.R. ............................. 228/49.1

Primary Examiner—Sam Heinrich
Attorney, Agent, or Firm—Cushman, Darby & Cushman

[57] ABSTRACT

A welder system that uses two pressure cylinders operating in series to control the movement of a spacer rod, thereby eliminating inaccuracies due to variations in pressure and resulting in precision welding of torque converters.

6 Claims, 5 Drawing Sheets

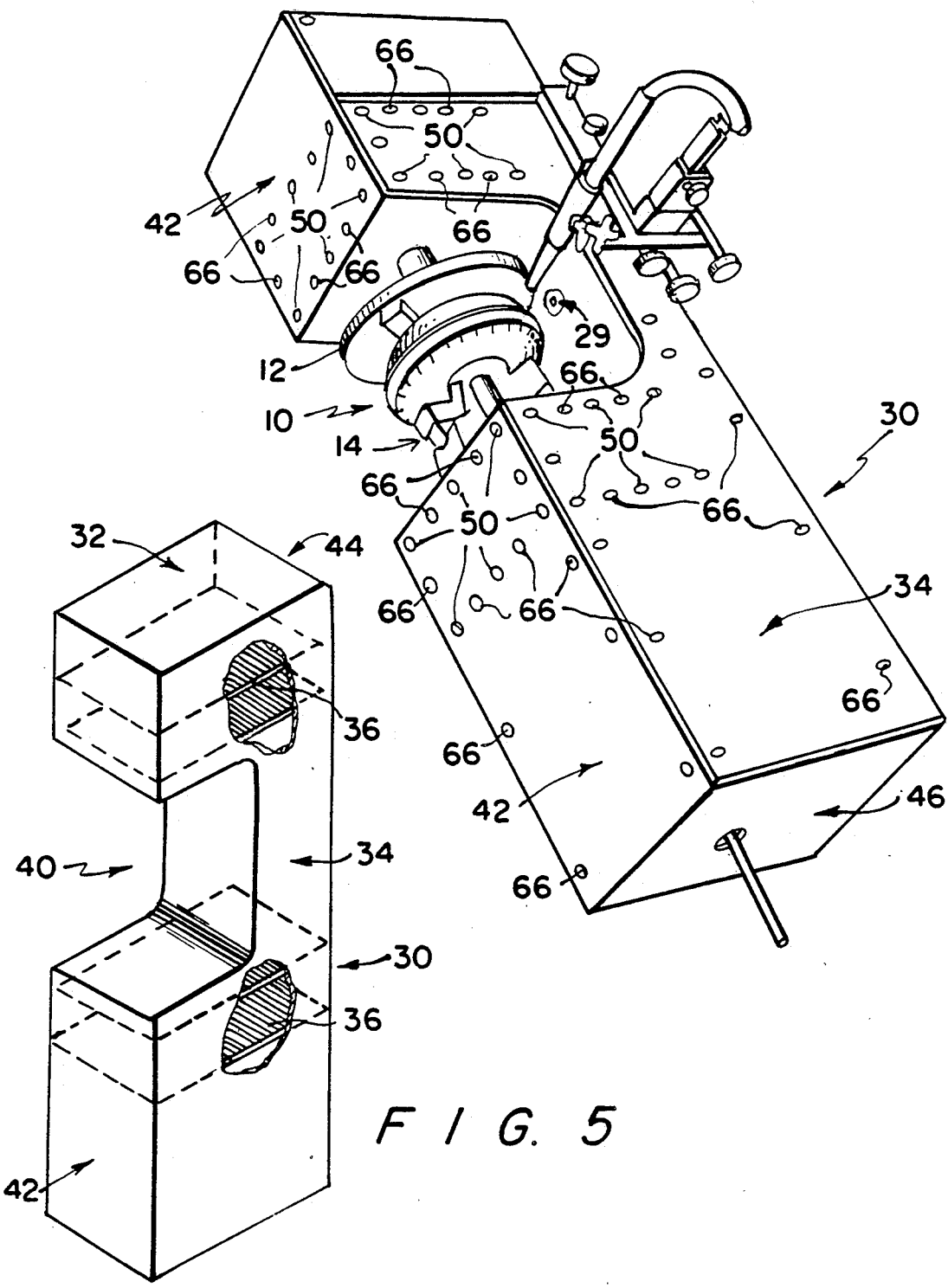

PRECISION AUTOMATIC CONVERTER WELDER SYSTEM

BACKGROUND OF THE INVENTION

1. Field of the Invention

The present invention is generally directed to a welder system, and more particularly, to a welder system for welding fluid torque converters with precision.

2. Description of the Prior Art

Many types of welder systems are known in the art. One of these systems uses hydraulic or pneumatic cylinders to place the converter in the proper position for welding. Such a system is illustrated in FIGS. 1 and 2.

Fluid torque converters, an example of which is illustrated in FIG. 7, have an exterior housing of an engine side cover 100 and a bowl shaped primary pump driven side cover 102, which are welded together along their joining surfaces. These outer covers, along with the internal parts such as races and bearings 104, stator 105, and internal turbine 106, form the converter.

Before the engine side cover and the primary pump driven side cover can be properly welded, they must first be brought together and then an internal spacing must be made so that the internal parts operate properly.

In order to accomplish this, the unwelded covers, with the internal parts in place, are held in welder system 10 between a moveable faceplate 12 and a fixed chuck 14 as shown in FIG. 1. Primary pump driven side cover is clamped into fixed chuck 14 and moveable faceplate 12 is moved towards fixed chuck 14 until the converter is secured therebetween. Moveable faceplate 12 is moved into position by pressure cylinder 16 advancing shaft 15. Once moveable faceplate 12 and fixed chuck 14 holds the converter covers together, a spacer rod 28 passes through a hole in fixed chuck 14 and is inserted into the converter through the converter's primary pump drive tube. Spacer rod 28 advances into the converter in the direction of moveable faceplate 12 until it comes in contact with the internally disposed turbine. Cylinder 18 uses pressure to advance one end of spacer rod 28 until it makes contact with the internal turbine. The pressure applied to cylinder 18 is equal to the pressure applied to cylinder 16, so that moveable faceplate 12 stays in the same position.

After contact is made with the internally disposed turbine, a specific distance that the two discs are to be separated is manually calibrated. This is accomplished by manually adjusting adjusting nut 26 attached to the other end of spacer rod 28, which end is on the other side of cylinder 18. As a result of tolerance variations from one converter assembly to the next, adjusting nut 26 must be tightened against cylinder 18 and then loosened an amount equal to the specific precise distance for spacing of the internal parts required for the best possible operation. Due to the tolerance variations, this calibration must be made for each individual converter assembly.

Once this calibration is finished, spacer rod 28, controlled again by pressure cylinder 18, advances the turbine the specific distance by momentarily dropping the pressure on cylinder 16. This, in turn, allows cylinder 18 to push the inside face of the engine side cover to ensure the proper spacing of the internal parts and securely hold the engine side cover against the moveable faceplate without bolting before welding takes place.

One of the major problems with this welder system is the use of only one cylinder 18 to control the two separate movements of the spacer rod 28. The use of only one cylinder 18, along with the one cylinder 16 that controls the movement of the moveable faceplate 12, makes the system very susceptible to variations in pressure. For example, a drop in pressure in a cylinder, due to a drop in pressure in the pressure supply line, can cause the spacer rod 28, the moveable faceplate 12, or both, to move, thus altering the specific distance established and resulting in a lack of precision. These variations in pressure can easily occur when many devices use the same pressure supply line. Specifically, unwanted movement of the spacer rod 28, which results in an inaccurate internal spacing of the internal parts, can be caused by a change in the supply pressure.

Also, for accurate welding, the moveable faceplate 12 and fixed chuck 14 must be truly concentric, perpendicular to the axis connecting the centers of the fixed chuck 14 and moveable faceplate 12, and parallel in all planes. However, the welder system of the prior art is welded to a single metal block. This form of mounting makes it very difficult to adjust the welder system on all planes. Inaccuracies are thus created because a proper alignment does not exist.

SUMMARY OF THE INVENTION

Accordingly it is the primary object of the present invention to provide an automatic converter welder system that overcomes the problems identified above in the art.

According to one aspect of this invention, a welder system is provided having a spacer rod whose two movements are controlled by two pressure cylinders in series, thereby eliminating any inaccuracies caused by variations in pressure.

According to another aspect of this invention, the welding system is mounted on a housing constructed of various plates joined in a specific manner to prevent misalignment of the welder system.

In carrying out the invention, one embodiment is a welder system using a spacer rod whose movement is controlled by two pressure cylinders operating in series. The use of the two cylinders in series allows the spacer rod to remain in position regardless of pressure variations.

BRIEF DESCRIPTION OF THE DRAWINGS

Further objects and advantages of this invention will become more apparent and more readily appreciated from the following detailed description of the present invention, taken in conjunction with the accompanying drawings, of which:

FIG. 4 is a perspective view of the welder system mounted in a housing in accordance with the present invention;

FIG. 5 is a cutaway perspective view of the housing in accordance with the present invention;

DETAILED DESCRIPTION OF THE PRESENTLY PREFERRED EXEMPLARY EMBODIMENTS

The preferred embodiments of the automatic precision welder system of the present invention will hereinafter be described in detail with reference to the accompanying drawings.

Figure 1:
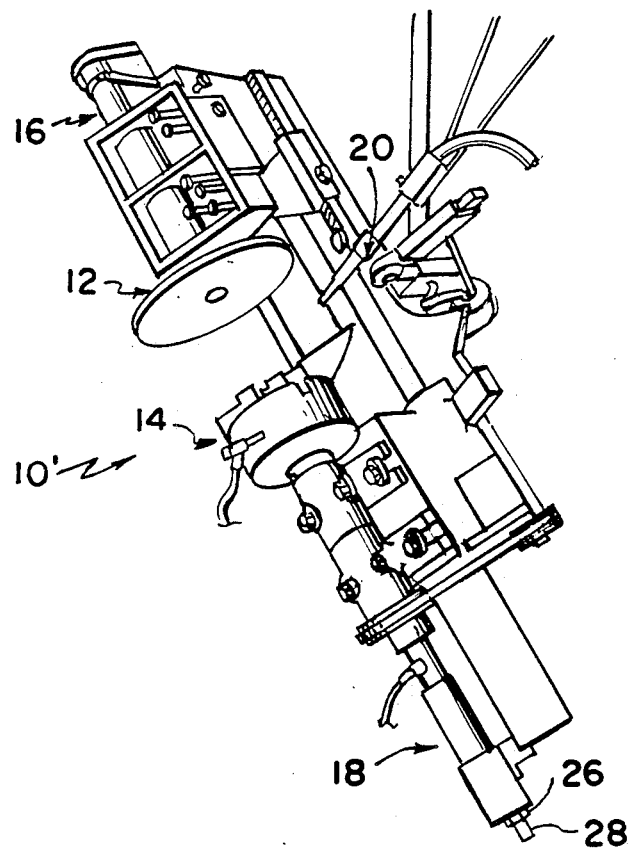
FIG. 1 is a perspective view of the welder system in accordance with the prior art.
Figure 2:
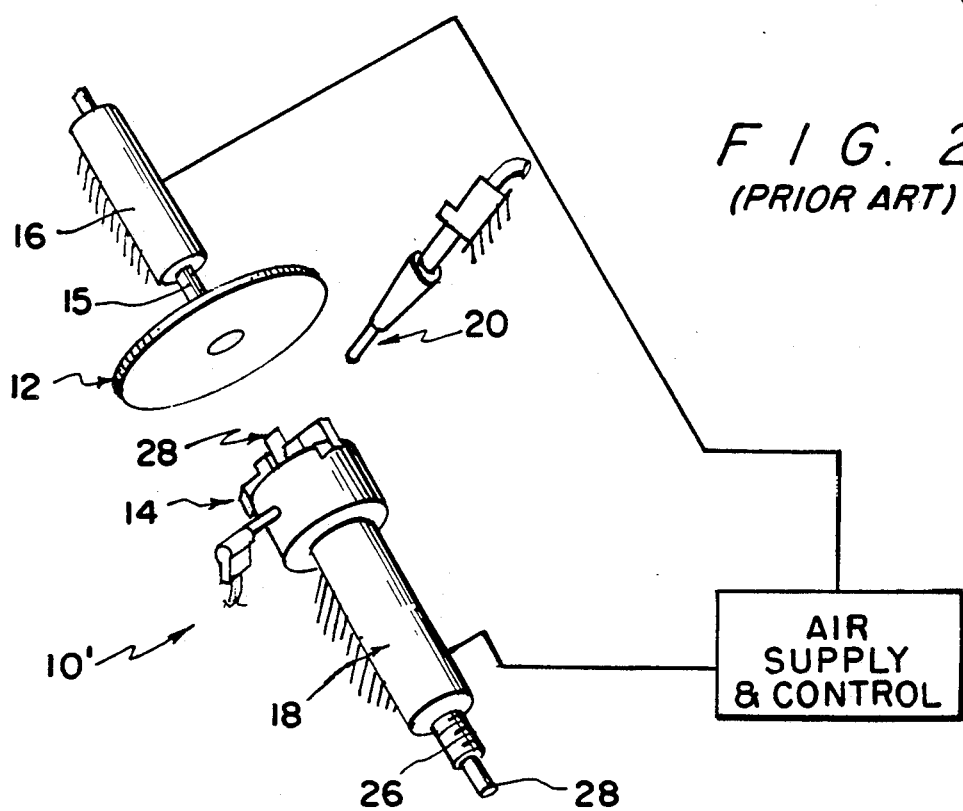
FIG. 2 is an enlarged perspective view of the cylinders, faceplate, and chuck of the welder system in accordance with the prior art.
Figure 3:
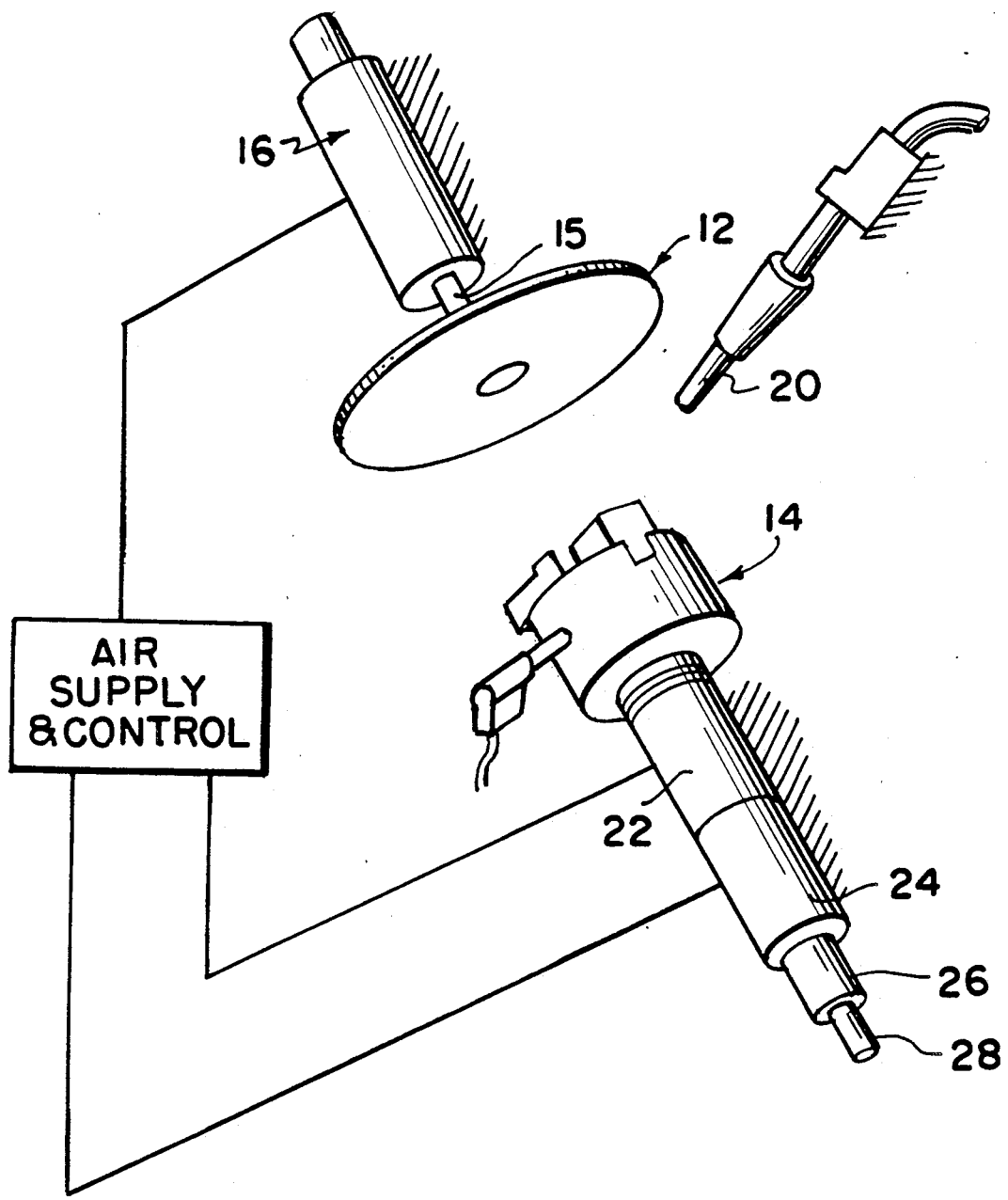
FIG. 3 is an enlarged perspective view of the cylinders, faceplate, and chuck in accordance with the present invention.

FIG. 3 is a perspective view of the welder system 10 in accordance with the present invention. Welder system 10 incorporates a moveable faceplate 12, a fixed chuck 14, a shaft 15, a spacer rod 28, and pressure cylinders 16, 22 and 24. Pressure cylinders 16, 22 and 24 may be hydraulic or pneumatic. Welder system 10 operates in the following manner.

In order to maintain accurate clearance of the internal parts in a torque converter, the assembled but unwelded converter is clamped to the fixed chuck 14 and the moveable faceplate 12 is moved in a direction towards fixed chuck 14. The moveable faceplate 12 is moved until it secures the converter between the moveable faceplate 12 and fixed chuck 14. Pressure cylinder 16 controls the movement shaft 15, which advances moveable faceplate 12, the function pressure cylinder 16 performs is referred to as a CLAMP function. Cylinder 16 can also be two separate cylinders that operate at the same time, which reduces the length of the whole welder assembly.

Fixed chuck 14 has a hole (not shown) in its center that allows spacer rod 28 to pass through. Pressure cylinders 22 and 24, connected in series, control the movement of spacer rod 28.

When the converter is secured between fixed chuck 14 and moveable faceplate 12, cylinder 22 operates to first advance spacer rod 28 through fixed chuck 14 and allow it to enter the converter through the converter's primary pump drive tube. Once inserted through the converter's primary pump drive tube, spacer rod 28 advances into the converter in the direction of moveable faceplate 12 until one end of spacer rod 28 makes contact with the internally disposed turbine. When spacer rod 28 makes this contact it is in the set position. Thus, pressure cylinder 22 performs a SET function. It should be noted that the pressure from cylinder 22 will not overcome the pressure from cylinder 16 because the total area of piston displacement on cylinder 16 is less than the area of piston displacement on cylinder 22 and the air supply pressure is equal. As such, spacer rod 28 will only contact, but not move, either the internally disposed turbine or the engine side cover.

Next the internal spacing of the internal parts must be set at a specific precise distance. This is accomplished by manually adjusting adjusting nut 26, as explained previously.

After this adjustment, second cylinder 24 is turned on. Pressure from pressure cylinder 24, along with the previously existing pressure from pressure cylinder 22, then overcomes the pressure on cylinder 16 to move the engine side cover, via the internally disposed turbine, the specific precise distance from the primary pump side cover.

By making this adjustment there is enough pressure in the two cylinders 22 and 24 to advance spacer rod 28 that required specific precise distance. When spacer rod 28 separates the two discs so that the internal parts have the spacing of the specific distance, it is then in the lock position. Typically this distance is between 0 and 15 thousandths of an inch. Thus, cylinder 24 operates to perform a LOCK function.

Once the converter is secured between moveable faceplate 12 and fixed chuck 14 and spacer rod 28 has been advanced to its lock position, the converter is ready to be welded. A DC motor spins the entire assembly of the converter, spacer rod 28, moveable faceplate 12 (now fixed in position for the welding operation) and fixed chuck 14 at about 1 rpm while a welder 20 is placed at the joining surfaces of the converter's discs.

It should be noted that welder assembly 10 can be rotated about pivot 29 that is attached to a mounting platform (not shown) to allow the welding bead to properly form, which will depend on the type of joint between the two covers of the converter. Because two different positions are available, the weld bead that forms will be parallel to the floor, whether the converter's primary pump driven side cover goes inside the engine side cover or outside the engine side cover.

The use of the two pressure cylinders 22 and 24 operating together to control the movement of spacer rod 28 provides stability to welder system 10 in response to variations in pressure. Because of this stability, spacer rod 28 can always be brought to the correct lock position and the converter can be welded with security in the knowledge that the specific precise distance established has not changed in response to variations in pressure. Thus the use of these two cylinders 22 and 24 to move spacer rod 28 results in a precision automatic converter welder system 10.

FIGS. 4-5 illustrate housing 30 on which welder system 10 is mounted. Housing 30 is constructed of various plates for structurally supporting welder system 10. More specifically, a cavity 40 is provided within which the fixed chuck 14 and moveable faceplate 12 are disposed in proper alignment. The construction of housing 30 requires upright plates 36, base plate 44, and side plates 34, which are constructed to provide a housing having exact structural alignment, as will be described hereinafter. The other external plates illustrated, which are head plate 32, bottom plate 46 and front plates 42 ar only for covering the housing formed, are made of sheet metal, and do not provide structural support.

Figure 6A:
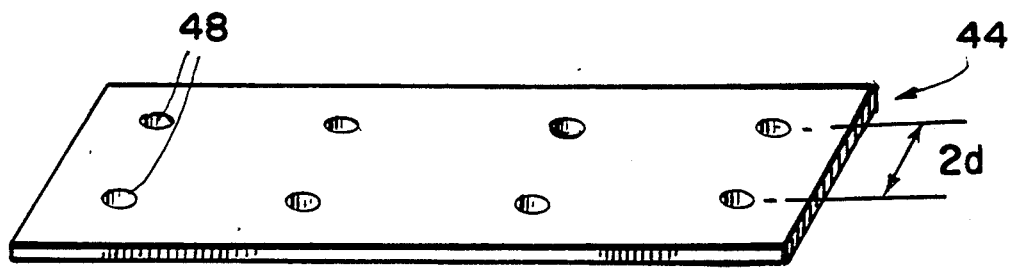
FIGS. 6A–6C illustrate the base plate, upright plates, and side plates of the present invention.

As shown in FIG. 6A, base plate 44 is preferably made of 2.0 inch thick metal planed to be rectangular and have 4 pairs of one-half inch diameter dowel holes 48, one pair for mounting each upright plate 36. In each hole is inserted a steel dowel 50.

Figure 6B:
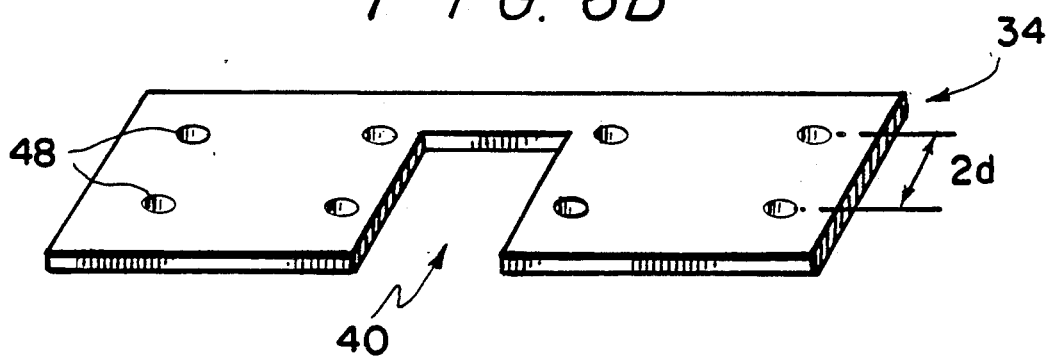

FIG. 6B illustrates a side plate 34. Side plate 34 is constructed of at least 0.5 inch metal, is substantially rectangular in shape, and contains 4 pairs of equally spaced dowel holes 48. A cut out portion in each side plate 34 defines cavity 40.

Figure 6C:
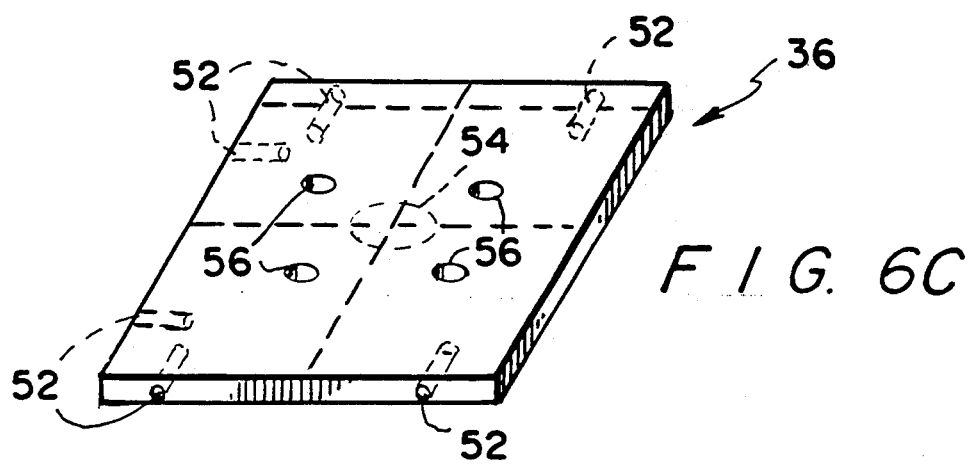
Figure 7:
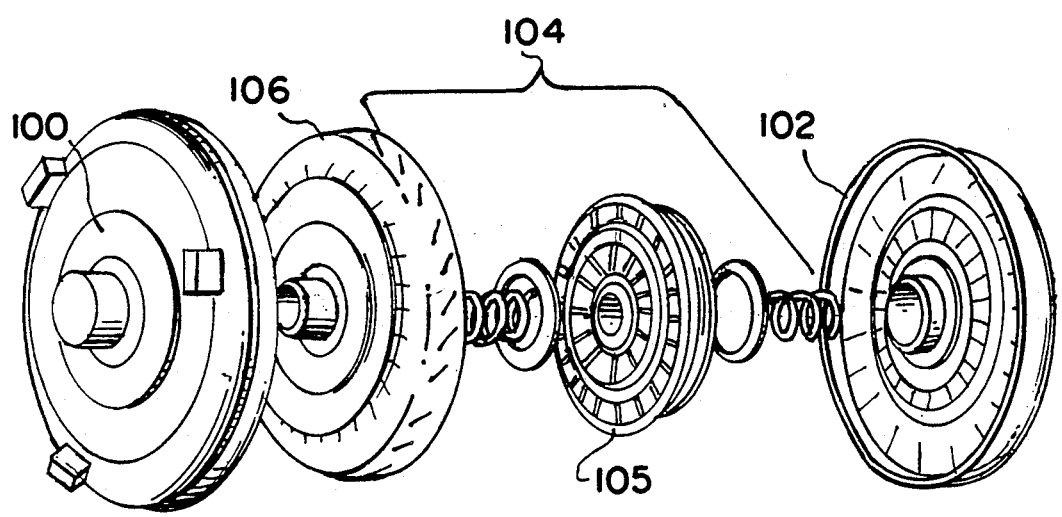
FIG. 7 illustrates an example of a fluid torque converter.

FIG. 6C illustrates one upright plate 36, which is constructed for attachment at one side to base plate 44 and at two sides to side plates 34.

Each upright plate 36 contains pre-drilled holes 52 which correspond exactly to the dowels inserted in the holes in base plate 44 and side plates 34 to ensure exact alignment. The dowels are used to ensure that all upright plates 36 are kept truly parallel to each other and perpendicular to base plate 44 and side plates 34.

To make upright plates 36 truly parallel to each other and perpendicular to the other plates, as shown in FIG. 6C, a truly square, 2.0 inch thick metal plate having 12 inch sides is formed. On the three sides of the truly square plate 36 are formed a pair of dowel holes 52, which exactly correspond to the dowel holes in base plate 44 and the side plates 34.

Because upright plates 36 have dowel holes positioned to exactly correspond to the dowel holes in the base plate 44 and side plates 34, dowels 50 ensure correct alignment, which alignment is then secured in aligned position by bolts 66 insertable through the external plates. Bolt 66 can be secured directly to upright plates 36, side plates 34, and base plate 34 to prevent misalignment of said housing when under stress.

Thus, this housing ensures that the welder assembly 10 can be mounted on upright plates 36 that are truly parallel.

As further illustrated in FIG. 6C, a plurality of holes 56 can be drilled in an identical location for each upright plate 36 and the dotted line center area 54 can be bored out for insertion of either fixed chuck 14 and moveable faceplate 12. The bored center area 54 will be aligned for all upright plates 36 and the holes 68 can be precisely drilled for mounting the moveable faceplate on one upright plate 36 and the fixed chuck on the other upright plate 36 in precise alignment. Thus the fixed chuck and the moveable faceplate are truly concentric and parallel, and perpendicular to the axis connecting their centers.

Incorporating welder system 10 in such a housing 30, as opposed to mounting the welder system 10 on a block as is done in the prior art, keeps welder system 10 in proper alignment. This results in a greater accuracy and precision in welding. Specifically, with the housing constructed in this manner, runout of the fixed chuck and moveable faceplate of less than 5 ten thousandths of an inch is obtained.

While only a few exemplary embodiments of this invention have been described in detail, those skilled in the art will readily appreciate that many modifications are possible in the preferred embodiments without materially departing from the novel teachings and advantages of this invention. Accordingly, all such variations and modifications are intended to be within the true spirit and valid scope of the invention as defined by the following claims.

What is claimed is:

1. Apparatus for welding together first and second covers of a fluid torque converter having internal parts comprising:
    means for securing said first and second covers;
    a first cylinder;
    a second cylinder connected in series with said first cylinder;
    spacer rod means, moveable by said first and second cylinders, for providing an internal spacing of a precise distance within said converter, said first cylinder moving said spacer rod means into contact with one of said internal parts and said second cylinder moving said spacer rod means said precise distance; and
    means for welding said separated first and second covers.

2. Apparatus according to claim 1 wherein said means for securing includes:
    a fixed chuck capable of allowing said spacer rod means to pass through it;
    a moveable faceplate aligned with said fixed chuck; and
    means for moving said moveable faceplate toward said fixed chuck to secure said first and second covers therebetween.

3. Apparatus according to claim 2 wherein said means for moving said moveable faceplate includes a third cylinder attached to said moveable faceplate.

4. Apparatus according to claim 1 wherein said precise distance is determined by an adjustment nut attached to said spacer rod means for limiting movement of said spacer rod means said precise distance after said spacer rod means contacts said first cover.

5. Apparatus for welding according to claim 1 wherein said first and said second cylinders are pneumatic.

6. Apparatus for welding according to claim 1 wherein said first and said second cylinders are hydraulic.

* * * * *